(12) United States Patent
Cragun et al.

(10) Patent No.: US 8,793,231 B2
(45) Date of Patent: *Jul. 29, 2014

(54) HETEROGENEOUS MULTI-LEVEL EXTENDABLE INDEXING FOR GENERAL PURPOSE ANNOTATION SYSTEMS

(75) Inventors: Brian J. Cragun, Rochester, MN (US); Julia E. Rice, Sunnyvale, CA (US); Peter M. Schwarz, San Jose, CA (US); William C. Swope, Morgan Hill, CA (US); Hoa T. Tran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1618 days.

This patent is subject to a terminal disclaimer.

(21) Appl. No.: 11/833,884

(22) Filed: Aug. 3, 2007

(65) Prior Publication Data
US 2007/0271249 A1 Nov. 22, 2007

Related U.S. Application Data

(63) Continuation of application No. 10/600,382, filed on Jun. 20, 2003, now Pat. No. 8,321,470.

(51) Int. Cl.
*G06F 7/00* (2006.01)
*G06F 17/30* (2006.01)

(52) U.S. Cl.
CPC .... *G06F 17/30292* (2013.01); *G06F 17/30315* (2013.01); *G06F 17/30336* (2013.01)
USPC .......................................... 707/696; 707/741

(58) Field of Classification Search
CPC ................... G06F 17/30292; G06F 17/30315; G06F 17/30336
See application file for complete search history.

(56) References Cited

U.S. PATENT DOCUMENTS

| 5,253,362 | A | 10/1993 | Nolan et al. |
| 5,309,359 | A | 5/1994 | Katz et al. |
| 5,404,295 | A | 4/1995 | Katz et al. |
| 5,548,739 | A | 8/1996 | Yung |
| 5,600,775 | A | 2/1997 | King et al. |

(Continued)

FOREIGN PATENT DOCUMENTS

| EP | 1039398 A3 | 5/2002 |
| WO | 1997015018 A1 | 4/1997 |

(Continued)

OTHER PUBLICATIONS

"GSDB 1.0 Schema Manual," Dec. 1996, <http://www.negr.org/research/sequence/schema.html.>.

(Continued)

*Primary Examiner* — Michael Hicks
(74) *Attorney, Agent, or Firm* — Patterson & Sheridan LLP

(57) ABSTRACT

Methods, systems, and articles of manufacture for indexing annotations made for a variety of different type (i.e., heterogeneous) data objects are provided. A set of parameters uniquely identifying an annotated data object may be converted to an index comprising a set of index values, each corresponding to a column in a homogeneous index table. In order to accommodate the indexing of heterogeneous data objects, a mapping may be provided for each different type (or classification) of data object that may be annotated, that defines how the identifying parameters of that type will be mapped to the columns of the homogeneous index table.

14 Claims, 14 Drawing Sheets

(56) References Cited

U.S. PATENT DOCUMENTS

| | | |
|---|---|---|
| 5,761,429 A | 6/1998 | Thompson |
| 5,832,474 A | 11/1998 | Lopresti et al. |
| 5,930,746 A | 7/1999 | Ting |
| 5,940,821 A | 8/1999 | Wical |
| 5,953,718 A | 9/1999 | Wical |
| 5,999,182 A | 12/1999 | Etchemendy et al. |
| 6,038,560 A | 3/2000 | Wical |
| 6,195,652 B1 | 2/2001 | Fish |
| 6,226,638 B1 | 5/2001 | Okura et al. |
| 6,226,792 B1 | 5/2001 | Goiffon et al. |
| 6,249,784 B1 | 6/2001 | Macke et al. |
| 6,260,043 B1 | 7/2001 | Puri et al. |
| 6,279,014 B1 | 8/2001 | Schilit et al. |
| 6,311,189 B1 | 10/2001 | deVries et al. |
| 6,332,144 B1 | 12/2001 | deVries et al. |
| 6,336,124 B1 | 1/2002 | Alam et al. |
| 6,453,312 B1 | 9/2002 | Goiffon et al. |
| 6,460,034 B1 | 10/2002 | Wical |
| 6,484,156 B1 | 11/2002 | Gupta et al. |
| 6,493,721 B1 | 12/2002 | Getchius et al. |
| 6,496,843 B1 | 12/2002 | Getchius et al. |
| 6,519,592 B1 | 2/2003 | Getchius et al. |
| 6,519,603 B1 | 2/2003 | Bays et al. |
| 6,523,028 B1 | 2/2003 | DiDomizio et al. |
| 6,549,922 B1 | 4/2003 | Srivastava et al. |
| 6,571,295 B1 | 5/2003 | Sidana |
| 6,665,581 B2 | 12/2003 | Nishida et al. |
| 6,665,681 B1 | 12/2003 | Vogel |
| 6,687,878 B1 | 2/2004 | Eintracht et al. |
| 6,725,227 B1 | 4/2004 | Li |
| 6,799,298 B2 | 9/2004 | deVries et al. |
| 6,826,559 B1 | 11/2004 | Ponte |
| 6,847,384 B1 | 1/2005 | Sabadell et al. |
| 6,871,318 B1 | 3/2005 | Wynblatt et al. |
| 6,889,260 B1 | 5/2005 | Hughes |
| 6,901,428 B1 | 5/2005 | Frazier et al. |
| 6,934,909 B2 | 8/2005 | Tewari |
| 6,956,593 B1 | 10/2005 | Gupta et al. |
| 6,996,558 B2 | 2/2006 | Dettinger et al. |
| 6,996,728 B2 | 2/2006 | Singh |
| 6,999,959 B1 | 2/2006 | Lawrence et al. |
| 7,010,779 B2 | 3/2006 | Rubin et al. |
| 7,013,307 B2 | 3/2006 | Bays et al. |
| 7,107,260 B2 | 9/2006 | Nakamura et al. |
| 7,152,072 B2 * | 12/2006 | Dobrowski et al. ............ 707/102 |
| 7,162,691 B1 * | 1/2007 | Chatterjee et al. ............ 715/205 |
| 7,194,483 B1 | 3/2007 | Mohan et al. |
| 7,243,301 B2 | 7/2007 | Bargeron et al. |
| 7,260,777 B2 | 8/2007 | Fitzsimons et al. |
| 7,315,857 B2 | 1/2008 | Dettinger et al. |
| 7,707,212 B2 | 4/2010 | Dettinger et al. |
| 2001/0051958 A1 | 12/2001 | deVries et al. |
| 2002/0026461 A1 | 2/2002 | Kutay et al. |
| 2002/0143860 A1 | 10/2002 | Catan |
| 2002/0174201 A1 | 11/2002 | Ramer et al. |
| 2003/0061028 A1 | 3/2003 | Dey et al. |
| 2003/0069881 A1 | 4/2003 | Huttunen |
| 2003/0074375 A1 | 4/2003 | Nakamura et al. |
| 2003/0196164 A1 | 10/2003 | Gupta et al. |
| 2004/0068489 A1 | 4/2004 | Dettinger et al. |
| 2004/0138946 A1 | 7/2004 | Stolze |
| 2004/0150669 A1 | 8/2004 | Sabiers et al. |
| 2004/0163042 A1 | 8/2004 | Altman |
| 2004/0192343 A1 | 9/2004 | Toyama |
| 2004/0205514 A1 | 10/2004 | Sommerer et al. |
| 2004/0205545 A1 | 10/2004 | Bargeron et al. |
| 2004/0260714 A1 | 12/2004 | Chatterjee et al. |
| 2004/0261016 A1 | 12/2004 | Glass et al. |
| 2005/0091197 A1 | 4/2005 | Dettinger et al. |
| 2005/0091198 A1 | 4/2005 | Dettinger et al. |
| 2005/0203876 A1 | 9/2005 | Cragun et al. |
| 2005/0256825 A1 | 11/2005 | Dettinger et al. |
| 2005/0256867 A1 | 11/2005 | Walther et al. |

FOREIGN PATENT DOCUMENTS

| | | |
|---|---|---|
| WO | 1999939286 A1 | 8/1999 |
| WO | 2000051021 A3 | 12/2001 |
| WO | 2001024060 A3 | 4/2003 |

OTHER PUBLICATIONS

Barghouti, Naser et al., Improvise—a process modeling interface with multimedia graph diagrams (Background and Overview), Electronic Proceedings of the ACM Workshop on Effective Abstractions in Multimedia: Layout, D Presentation, and Interaction, Oct. 1995, ACM, New York, New York, United States.

Electrical Schematics Page, Jefferson Lab: Exploring the Nature of MAnER, Apr. 25, 2002, retrieved Oct. 14, 2006, <https://www.jlab.org/accel/inLgroup/elecl.htm>.

PCT International Search Report dated May 10, 2004, International Application No. PCT/EP20041051082, International Filing Date Oct. 6, 2004.

* cited by examiner

INDEX TABLE (TEXT DOCUMENT) — 152

| INDEX | COL 1 | COL 2 | COL 3 | COL 4 | COL 5 |
|---|---|---|---|---|---|
| 1 | LOCATION | FILE | — | — | — |
| 2 | LOCATION | FILE | SECTION | — | — |
| 3 | LOCATION | FILE | SECTION | PARAGRAPH | — |
| 4 | LOCATION | FILE | SECTION | PARAGRAPH | WORD |
| ... | | | | | |

COL 2 → DOCUMENT INDEX
COL 3 → SECTION INDEX
COL 4 → PARAGRAPH INDEX
COL 5 → WORD INDEX

FIG. 6A

INDEX TABLE (DATABASE OBJECTS) — 152

| INDEX | COL 1 | COL 2 | COL 3 | COL 4 | COL 5 |
|---|---|---|---|---|---|
| 1 | LOCATION | — | — | — | — |
| 2 | LOCATION | TABLE | — | — | — |
| 3 | LOCATION | TABLE | COLUMN | ROW | — |
| 4 | LOCATION | TABLE | COLUMN | — | — |
| 5 | LOCATION | TABLE | — | ROW | — |
| ... | | | | | |

COL 2 → DATABASE INDEX
COL 3 → TABLE INDEX
COL 4 → CELL INDEX
COL 5 → COLUMN INDEX
(ROW INDEX)

FIG. 6B

HETEROGENEOUS MULTI-LEVEL EXTENDABLE INDEXING FOR GENERAL PURPOSE ANNOTATION SYSTEMS

CROSS-REFERENCE TO RELATED APPLICATIONS

This is a continuation of U.S. patent application Ser. No. 10/600,382 filed Jun. 20, 2003 now U.S. Pat. No. 8,321,470, which is related to commonly-owned U.S. Pat. No. 6,519,603, entitled "Method and System for Organizing an Annotation Structure and for Querying Data and Annotations," which are both herein incorporated by reference.

BACKGROUND OF THE INVENTION

1. Field of the Invention

The present invention relates to the field of data entry and retrieval and, more particularly, to a method and system for indexing annotations made for a variety of heterogeneous data objects.

2. Description of the Related Art

An annotation system is used to create, store, and retrieve descriptive information about objects. Virtually any identifiable type of object may be annotated, such as a matrix of data (e.g., a spreadsheet or database table), a text document, or an image. Further, subportions of objects (sub-objects) may be annotated, such as a cell, row, or column in a database table or a section, paragraph, or word in a text document. Some annotation systems store annotations separately, without modifying the annotated data objects themselves. For example, annotations are often contained in annotation records stored in a separate annotation store, typically a database. The annotation records typically contain information about the annotations contained therein, such as the creation date and author of the annotation, and an identification of the annotated data object, typically in the form of an index.

An indexing scheme is typically used to map each annotation to the annotated data object or sub-object, based on the index. Therefore, the index must provide enough specificity to allow the indexing scheme to locate the annotated data object (or sub-object). Further, the indexing scheme must work both ways: given an index, the indexing scheme must be able to locate the annotated data object and, given an object, the indexing scheme must be able to calculate the index for use in classification, comparison, and searching (e.g., to search for annotations for a given data object).

Databases are typically used as the annotation store for performance reasons, so that annotation records can be efficiently stored and retrieved. Therefore, the annotation indexing scheme should be designed so that the annotation records can be efficiently indexed, for example, taking advantage of existing indexing technology that utilizes database keys for indexing. A database key is a unique identifier for an entity in a database table (e.g., a social security is often used as a database key). To enable searching, sorting, and comparisons (necessary to query an annotation database), it is generally a requirement that database keys have a homogeneous content and attribute count (i.e., the same number and type of parameters).

However, a problem arises when the annotations must reference a variety of different (i.e., heterogeneous) types of objects, which is fairly common in modern business enterprises. For example, an annotation system for a biomedical enterprise may need to annotate documents, experimental data, genomic data, images, and the like. The problem arises because each of these different types of objects has a different way of identifying itself, and may also have a different number and type of sub-objects, resulting in different types of indexes for each. For example, a database table may be indexed using four parameters (location, table, row, and column), while a text document may be indexed using five parameters (location, file, section name, paragraph, and word). Thus, ideally, the indexing method for each type of object would be allowed to be different.

Given that an annotation system may need to index a variety of different data objects having a variety of different identifying parameters, the requirement to be able to index and search the annotation store seems in opposition to the conventional database indexing requirement that database keys used for indexing have a homogeneous content and attribute count. Accordingly, there is a need for an improved method for indexing annotations, preferably that allows for the flexible identification of a variety of different type annotated data objects.

SUMMARY OF THE INVENTION

The present invention generally is directed to a method, system, and article of manufacture for indexing annotations made for a variety of different type objects.

One embodiment provides a method generally including creating an annotation for a first data object identified by a first plurality of identifying parameters, creating an index for the first data object, the index comprising one or more index values, each generated based on one or more of the first plurality of identifying parameters, creating an annotation record containing the annotation and the index for the first data object.

Another embodiment provides a method of managing annotations for a plurality of different type data objects. The method generally includes receiving a set of parameters identifying a data object, selecting, based on the set of identifying parameters, a mapping from a plurality of mappings, each containing a different set of mapping functions, and creating an index for the data object by mapping the identifying parameters to columns in an index table, as specified by the mapping functions of the selected mapping.

Another embodiment provides a computer-readable medium containing a program for indexing annotations. When executed by a processor, the program performs operations generally including creating an annotation for a data object identified by a plurality of identifying parameters, creating an index for the data object, the index comprising one or more index values, each generated based on one or more of the plurality of identifying parameters, and creating an annotation record containing the annotation and the index for the data object.

Another embodiment provides a system including an annotation database for storing annotation records containing annotations for the different type data objects, an index table for storing indexes for the different type data objects, the index having a plurality of columns, each corresponding to a different value of the indexes, a plurality of mappings, each containing functions for mapping a set of identifying parameters for a different type of data object to one or more columns in the index table, and an executable annotation component. The annotation component is generally configured to receive sets of parameters identifying data objects and, for each set of identifying parameters received, select one of the mappings based on the corresponding set of identifying parameters, and create an index for the first data object by mapping the first set of identifying parameters to columns in the index table, as specified by the mapping functions of the selected mapping.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 6A and 6B illustrate exemplary data object indexes for a text document and a database table, respectively, according to one embodiment of the present invention.

DETAILED DESCRIPTION OF THE PREFERRED EMBODIMENTS

Figure 1:
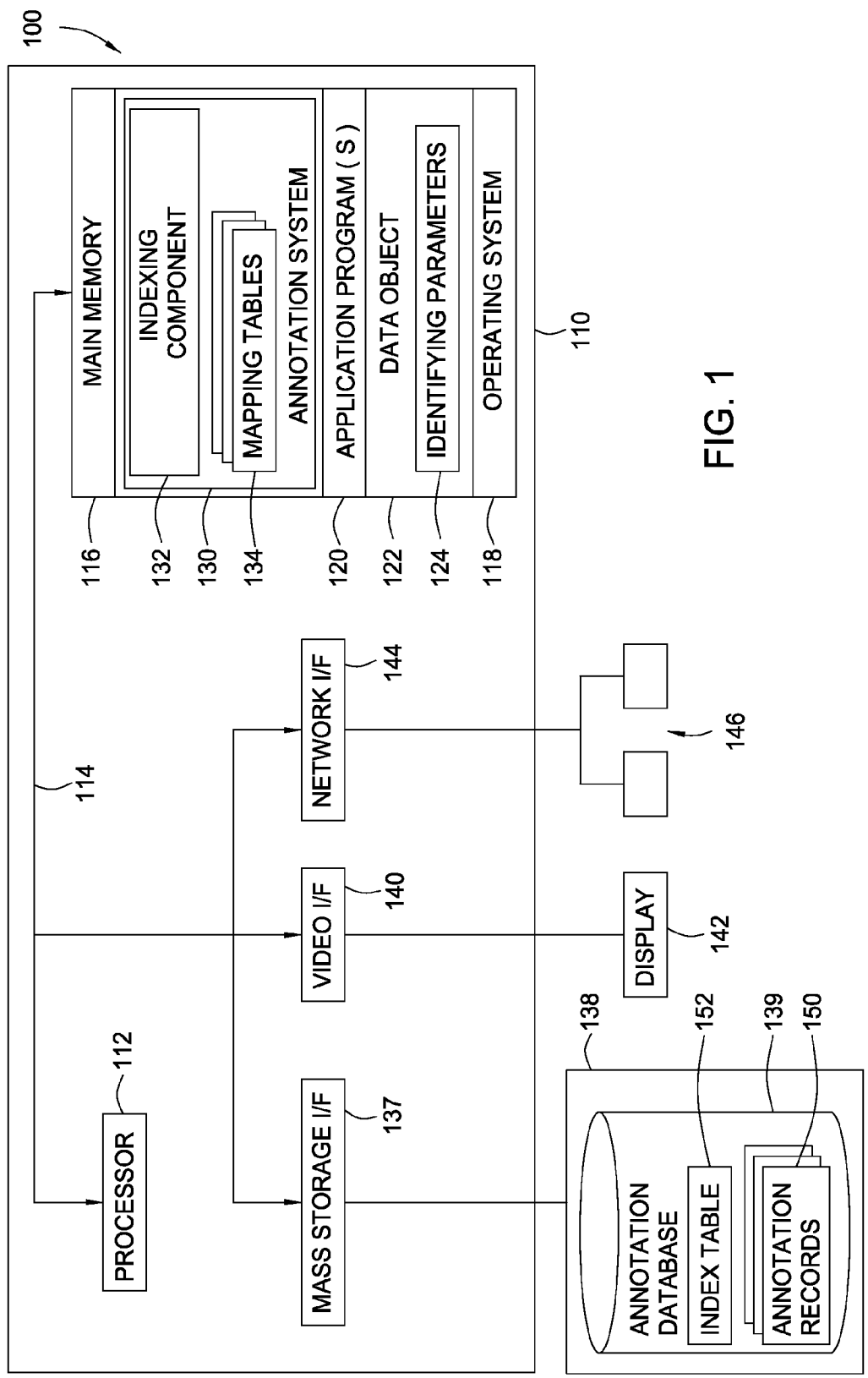
FIG. 1 is a computer system illustratively utilized in accordance with embodiments of the present invention.

The present invention provides methods, systems, and articles of manufacture that may be used for indexing annotations made for a variety of different type (i.e., heterogeneous) data objects. A set of parameters uniquely identifying an annotated data object may be converted to an index comprising a set of index values, each corresponding to a column in a homogeneous index table. In order to accommodate the indexing of heterogeneous data objects, a mapping may be provided for each different type (or classification) of data object that may be annotated, that defines how the identifying parameters of that type will be mapped to the columns of the homogeneous index table. By generating a homogeneous set of index values, conventional indexing schemes may be utilized to organize and search annotations made for a variety of different object types. Indexing annotations for new classifications of data objects may be readily supported via the addition of new mappings, without having to redesign the index table or the underlying indexing scheme.

As used herein, the term annotation generally refers to any type of descriptive information associated with one or more data objects. Annotations may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation. Accordingly, it should be understood that the following techniques described with reference to textual annotations may also be applied to other types of annotations, as well, and, more generally, to any type of data object that references another data object. Further, in order to facilitate the following discussion, the term document will generally refer to any type of file, or other type collection of data, that contains an annotated data sub-object or is annotated itself, including, but not limited to text documents, databases, database tables, spreadsheets, HTML pages, Adobe Acrobat® (PDF) documents, image files, other multimedia files, and any other type of document or file that may be annotated or may contain annotated sub-objects.

One embodiment of the invention is implemented as a program product for use with a computer system such as, for example, the computer system 110 of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, the data processing environment 100 is shown. In general, the data processing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries computer system available from International Business Machines (IBM) of Armonk, N.Y.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the networked devices 146. The display 142 may be any video output device for outputting viewable information. The networked devices 146 may be any combination of any type networked devices, such as networked workstations, servers, printers, and network accessed storage (NAS) devices.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., DASD 138) or on another computer coupled to the computer system 110 via bus 114.

The memory 116 is shown configured with an operating system 118. The operating system 118 is the software used for managing the operation of the computer system 110. Examples of suitable operating systems include such as IBM's OS/400, IBM's AIX, Unix, Linux, Microsoft Windows®, and the like. The memory 116 further includes at least one application 120 and an annotation system 130. For some embodiments, the annotation system 130 may be integrated with the operating system 118 and/or may be capable of operating in a stand alone manner, for example, without an application 120.

The application 120 and the annotation system 130 are software products comprising a plurality of instructions that are resident at various times in various memory and storage devices in the computer system 110. When read and executed by one or more processors 112 in the computer system 110, the application 120 and the annotation system 130 cause the computer system 110 to perform the steps necessary to execute steps or elements embodying the various aspects of the invention. The application 120 is generally configured to access (i.e., generate, edit, modify, display, etc.) a data object 122.

The data object 122 may be any type data object, such as a text document, a spreadsheet, a database file, a database table, a multimedia file, or any subcomponent thereof, and may be identified by a set of identifying (ID) parameters 124. As will be described in greater detail below, the ID parameters 124 may include any suitable number and type of parameters containing sufficient information to uniquely identify the data object 122, and the exact contents therein may vary for each type of object. However, each set of ID parameters 124 will likely include at least one parameter specifying a location of the data object 122, such as a full file name including a full directory path or a Uniform Resource Locator (URL).

The annotation system 130 is generally configured to allow users of the application program 120 to generate, store, and retrieve annotations associated with the data object 122. The annotations may be contained in annotation records 150, for example, stored in an annotation database 139 (e.g., in the DASD 138). The annotation records 150 may also contain various information about the annotation, such as the author and creation date of the annotation, as well as an index identifying the annotated data object 122. While illustrated as separate from the application 120, for some embodiments, the annotation system 130 may be an integral part of the application 120 or a "plug-in" application. In either case, as illustrated, the annotation system 130 may include various software components, such as an indexing component 132 configured to generate an index for the data object 122 based on the ID parameters 124 and one or more mappings, which may be contained in mapping tables 134. Indexes created for annotated data objects 122 may be stored in an index table 152 in the annotation data base 139.

Annotation Indexing

Figure 2A:
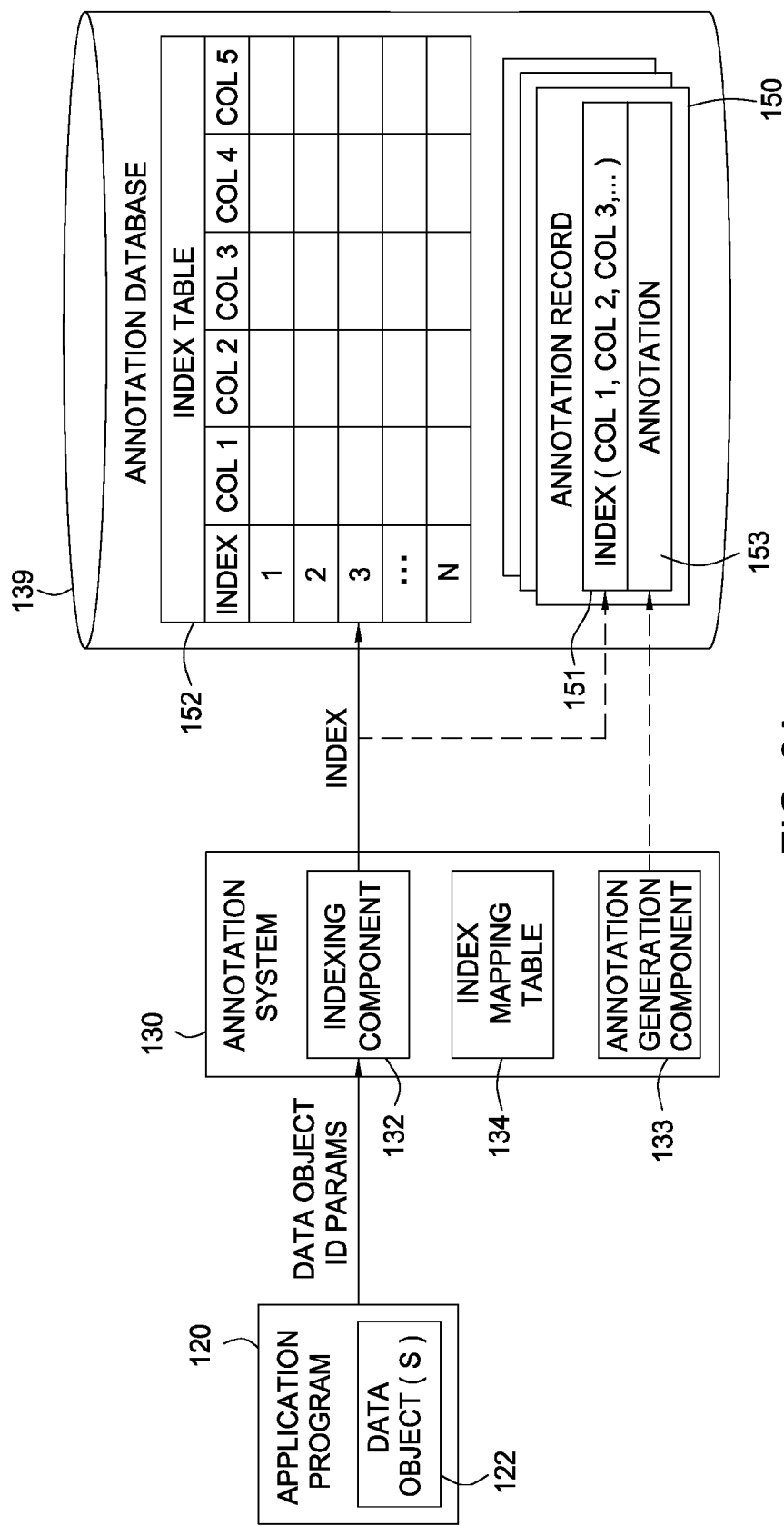
FIGS. 2A and 2B are relational views of exemplary components according to one embodiment of the present invention.
Figure 2B:
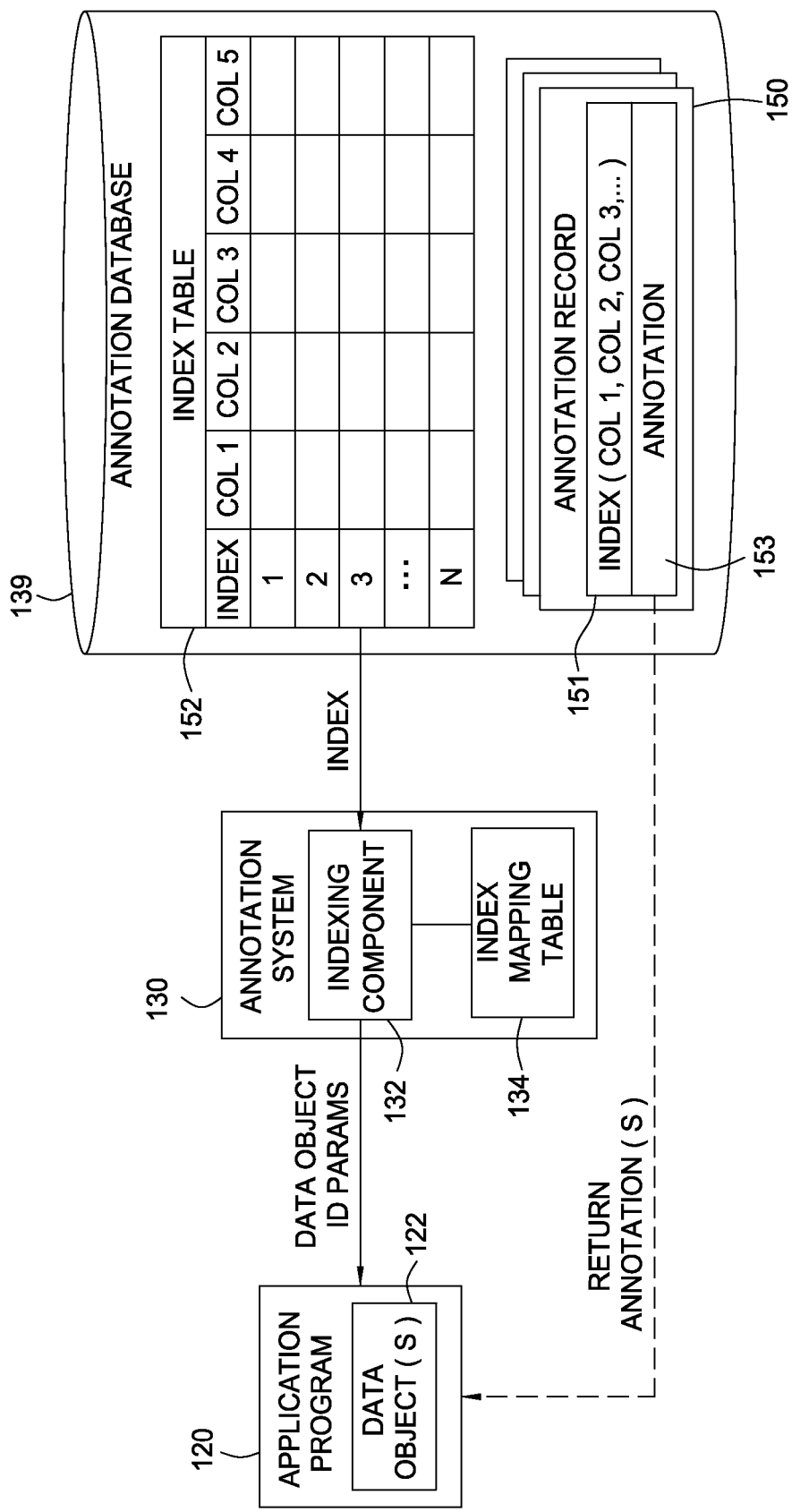

FIGS. 2A and 2B are relational views of various components of the annotation system 130 during annotation generation and annotation retrieval, respectively, that illustrate the creation and utilization of indexes according to one embodiment of the present invention. As illustrated in FIG. 2A, the indexing component 132 may receive, from the application program 120, a set of ID parameters for a data object 122 to be annotated. The indexing component 132 may then create an index 151 based on the set of ID parameters, for use in indexing an annotation 153 created for the data object 122. As illustrated in FIG. 2B, upon retrieving an annotation from the annotation database 130, the indexing component may convert an index for a retrieved annotation into a set of ID parameters 124, allowing the application program 120 to identify the data object associated with the annotation.

Figure 3:
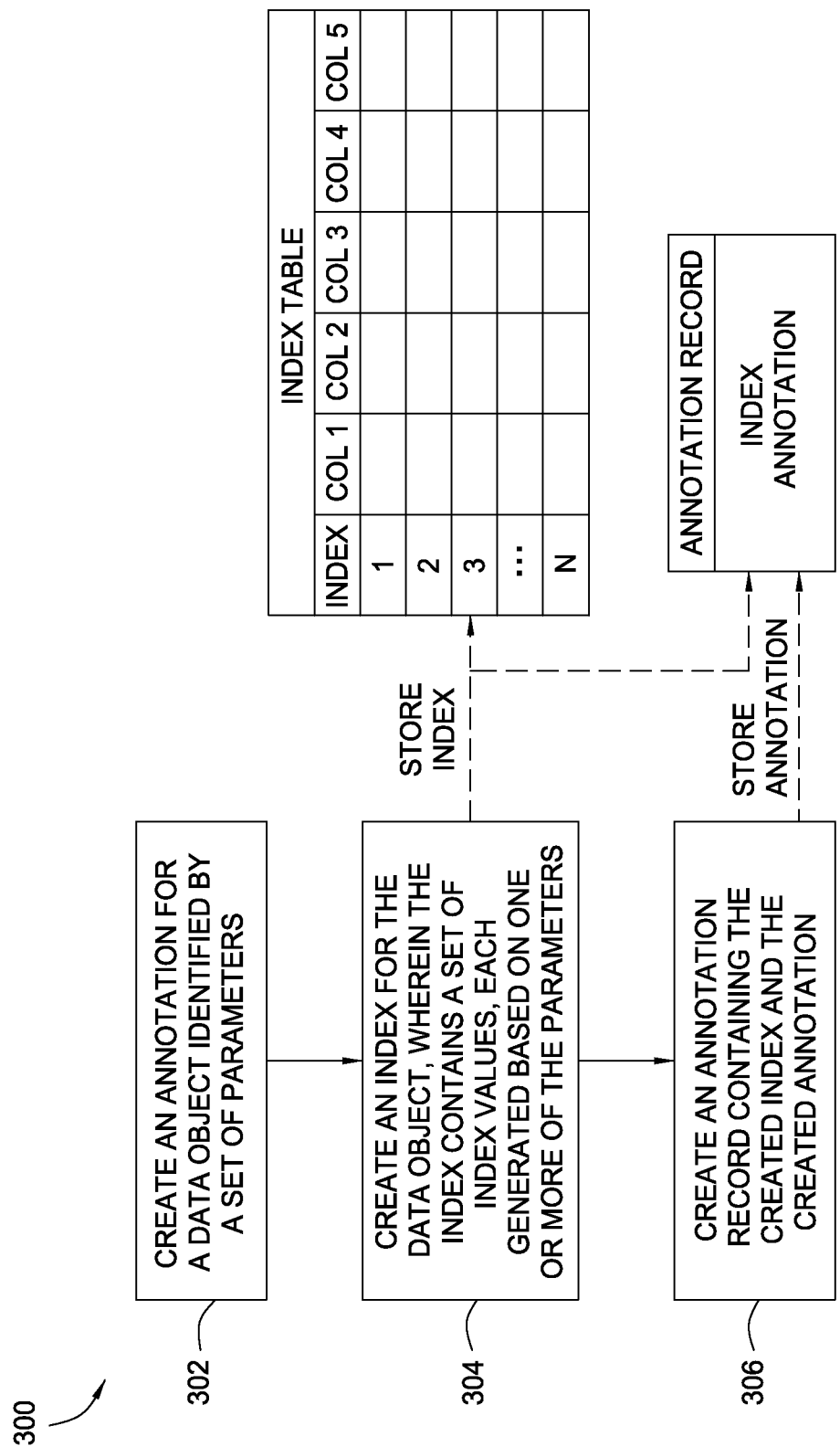
FIG. 3 is a flow diagram of exemplary operations for indexing an annotation according to one embodiment of the present invention.

Operation of the annotation system 130 and components therein may best be described with reference to FIG. 3, which illustrates exemplary operations 300 for creating and indexing an annotation, according to one embodiment of the present invention. The operations 300 begin, at step 302, by creating an annotation for a data object identified by a set of ID parameters. For example, an annotation 153 for the data object 122 may be created via an annotation generation component 133, such as a graphical user interface (GUI), included with the annotation system 130. A user may invoke the annotation generation component 133 from the application program 120, for example, after selecting the data object 122 to be annotated.

For some embodiments, the annotation generation component 133 may allow annotations to be created in a way that allows searching the annotation database 139 for annotations satisfying certain query conditions (as described below with reference to FIG. 11). Methods and apparatus for capturing annotations in a way that allows queries with conditions or predicates on annotations (as well as the annotated data) are described in the commonly-owned U.S. Pat. No. 6,519,603, entitled "Method and System for Organizing an Annotation Structure and for Querying Data and Annotations," which is herein incorporated by reference.

At step 304, an index 151 is created for the annotated data object 122, wherein the index 151 comprises a set of index values, each index value generated based on one or more of the ID parameters 124. As illustrated, the index 151 may be added to an index table 152 containing columns, each corresponding to one of the index values. At step 306, an annotation record is created containing the index for the data object and the annotation created for the data object. As described below with reference to FIG. 7, in some cases, the index table 152 may be queried to generate a list of annotated data objects contained in a document or to generate a list of annotations for a specified data object, as described below, with reference to FIG. 9.

Figure 4A:
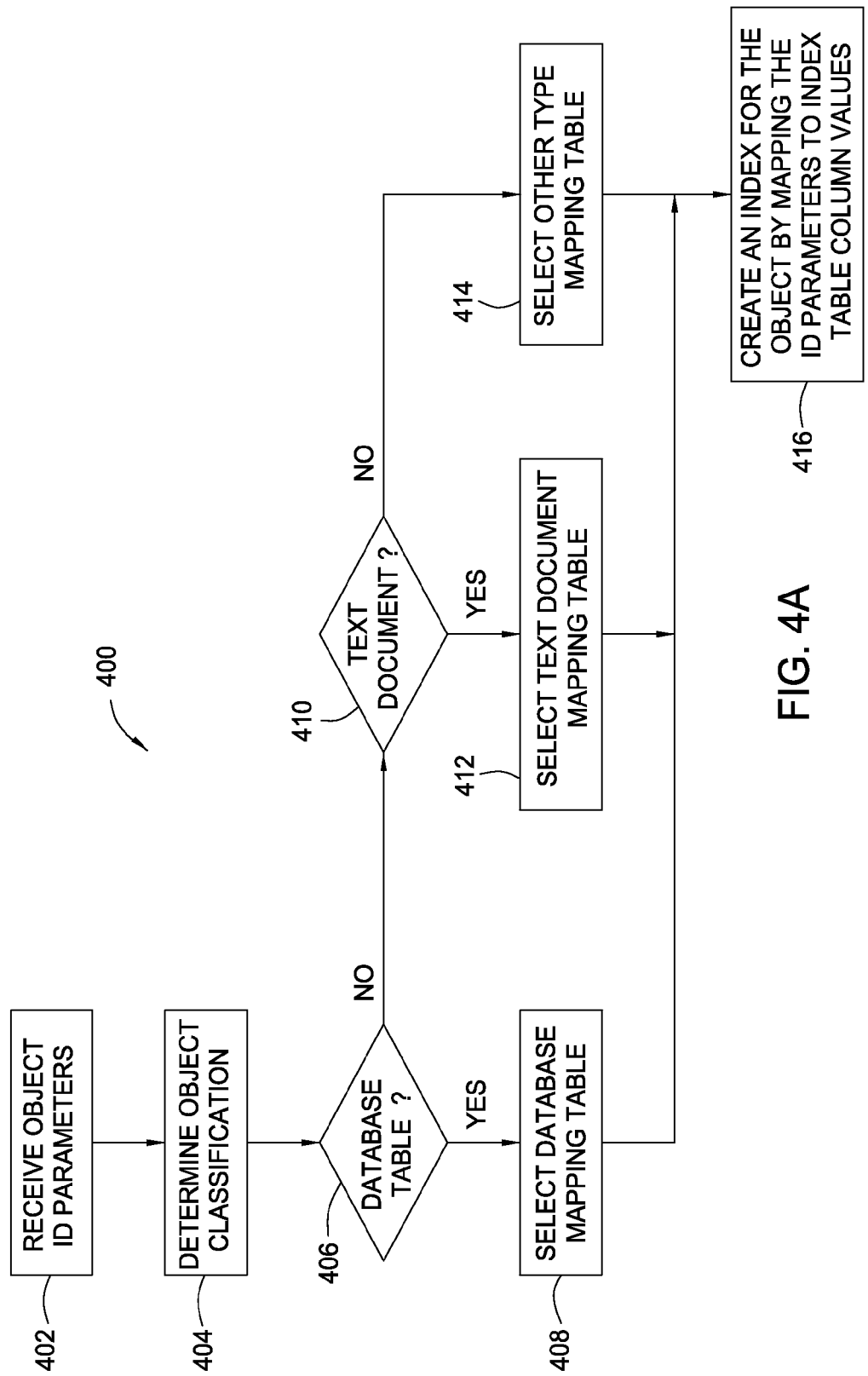
FIGS. 4A and 4B are flow charts illustrating exemplary operations of an indexing component according to one embodiment of the present invention.

The exact operations performed to create the index 151 based on the ID parameters 124 may vary with different data types, and may be dictated by a mapping table 134 associated with the data type of the annotated data object 122. The mapping table 134 may include one or more mappings (e.g., information, such as mapping functions, used to map ID parameters to index values). FIG. 4A illustrates exemplary operations 400 that may be performed by the indexing component 133 for creating the index 151 for the data object 122 based on the ID parameters 124. For example, the operations 400 may comprise an index generation subroutine, called by the annotation system 130 or the application program 120, in order to convert the ID parameters 124 into a set of one or more values for use with the index 151.

The operations 400 begin, at step 402, by receiving object ID parameters 124, for example, after invoking the annotation generation component 133 to create the annotation 153. As previously described, the ID parameters 124 may uniquely identify the data object 122, and the exact type and number of the parameters 124 may vary depending on the type of data object 122. For example, if the data object 122 is a text document (or a sub-component thereof), the ID parameters 124 may include parameters for a location, file, section name, paragraph and word. Further, some ID parameters may specify a file name having an extension indicative of the type of file.

At step 404, the annotated data object 122 is classified, for example, based on the ID parameters 124, as being associated with a text document, a database table, or other type of document. The determined classification may be used to select an appropriate mapping table 134 for converting the ID parameters 124 to index values. For example, if the data object 122 is classified as being associated with a database, a database mapping table 134 is selected, at step 408. If the data object 122 is classified as being associated with a text document, as determined at step 410, a text document mapping table 134 is selected, at step 412.

If the data object is classified as being associated with another type of document, processing proceeds to step 414 to select a mapping table for the other type document. Examples of other types of documents that may be supported by the annotation system 130 include, but are not limited to, Adobe Acrobat® files (having objects identified by one or more of an ObjectID, GenNumber, Offset, and Length) and HTML document (with objects identified by one or more of an Anchor, Image, and Link). Accordingly, one advantage of the indexing scheme described herein is that supporting a new type of data object classification essentially requires little more than the development of a new mapping table 134 configured to map the ID parameters 124 of the new type of data object to columns of the index table 152.

At step 416, the index 151 is created for the object 122 by mapping the ID parameters 124 to column values of the index table 152, as specified by the selected mapping table 134. The mapping tables 134 may each contain a set of mapping functions that specify how to convert the ID parameters 124, which may vary in number and/or type with each different classification of data type, into an index 151 comprising a homogeneous set of index values. In other words, the mapping tables 134 ensure that indexes 151 created for different types of data objects 122 may comprise the same type and number of index values, regardless of their corresponding type (e.g., text document, database table, etc.), by mapping one or more of the ID parameters 124 to one or more of the column values of the index table 152.

Exemplary Mappings

Figure 5A:
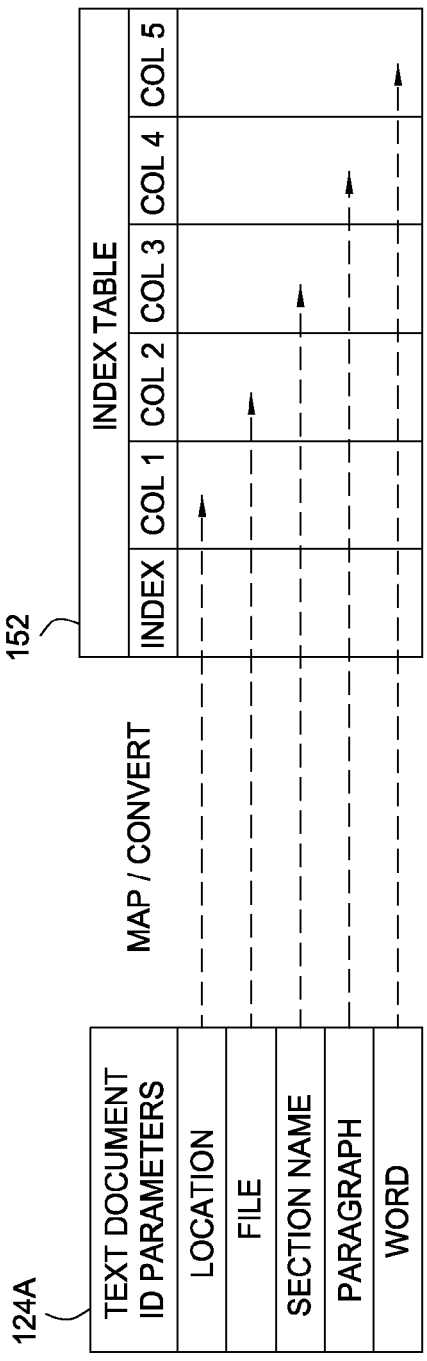
FIGS. 5A-5C illustrate exemplary index table mappings according to one embodiment of the present invention.
Figure 5B:
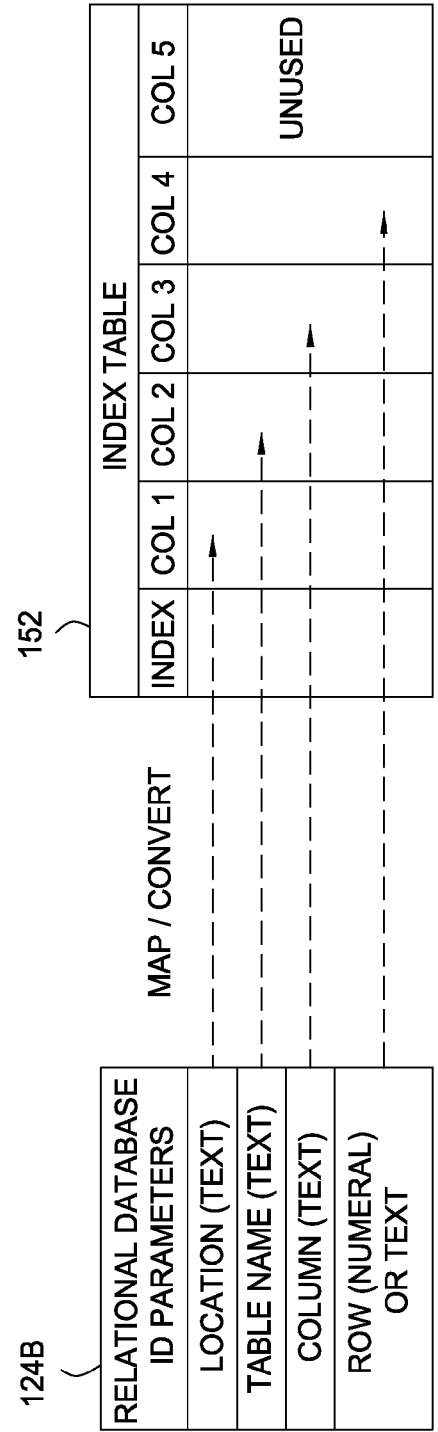
Figure 5C:
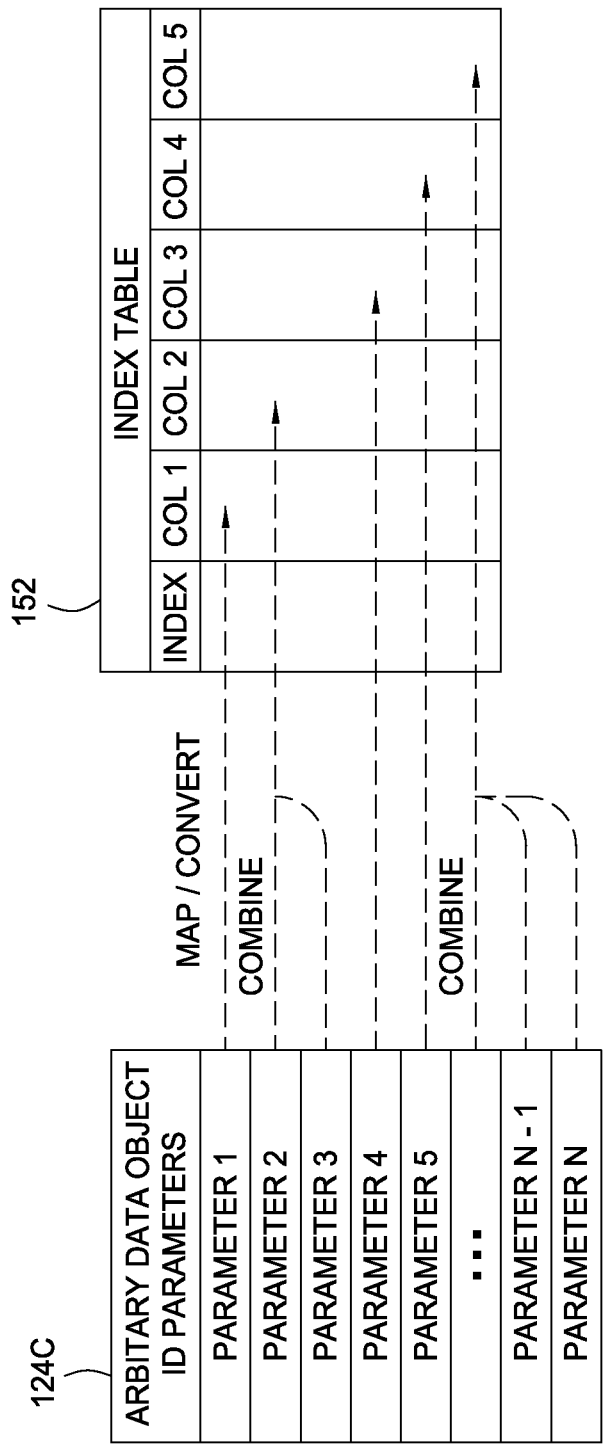

FIGS. 5A-5C illustrate exemplary mappings of ID parameters 124 for different types of data objects to column values of the index table 152. Depending on the embodiment, separate index tables 152 may be provided for each different data type or different portions of the same index table 152 may be allocated to indexes for different types of data objects. For example, a first portion of the index table 152 (e.g., defined by a first range of one or more of the column values) may be allocated to data objects related to text documents, while a second portion of the index table 152 (e.g., defined by a second range of one or more of the column values) may be allocated to data objects related to databases. The index table 152 may be further partitioned to allocate portions to different documents (e.g., a range of column values generated from file or database table names), or different sub-portions thereof (e.g., a range of column values generated from database columns or rows, text document paragraphs or words, or any such sub-index column value).

For illustrative purposes, the index table 152 of FIGS. 5A-5C is shown with 5 columns. However, the types of objects indexed, the types of searches supported and desired characteristics of the indexing performance may dictate the actual number of columns in the index table 152 for a particular implementation. Further, for some embodiments, an index table 152 may include an additional column containing a single value, generated from the other column values that uniquely identifies the index. Rather than store multiple index table column values with each annotation record 150, this single value may be stored, which may facilitating searching.

As illustrated in FIG. 5A, one configuration of ID parameters $124_A$ of a data object associated with a text document may be mapped to a 5-column index table 152 via a one-to-one mapping, with each parameter mapped directly to a corresponding column. In other words, a corresponding mapping table 134 may specify that the first parameter (location) is mapped directly to the first column, the second parameter (file name) is mapped directly to the second column, and so on. Of course, the illustrated text document ID parameters $124_A$ are exemplary only and other configurations of ID parameters 124 for text documents may include other and/or different parameters than those illustrated, such as page, offset, and length parameters that uniquely identify an annotated portion of the document. In other words, different types of ID parameters 124 may be used to identify data objects within the same type of document.

As illustrated in FIG. 5B, in some cases, there may be more columns in the index table 152 than there are ID parameters 124. FIG. 5B illustrates the mapping of relational database ID parameters $124_B$ to columns in the index table 152. As shown, because the ID parameters $124_B$ may only include four parameters, one or more of the index table columns may not be used. In such cases, the mapping table 134 may populate an unused column with an empty value (e.g., COL5=NULL).

On the other hand, as illustrated in FIG. 5C, in some cases, there may be fewer columns in the index table 152 than there are ID parameters 124, as shown by the Arbitrary Data Object ID Parameters $124_C$ (which may represent any set of ID parameters 124 greater in number than index table columns). In such cases, more than one of the ID parameters $124_C$ may be combined to generate a single column value. Of course, the combination should be accomplished in such a way that the single column value uniquely identifies the combination of parameters. As an example, parameter 2 may be mapped to a first set of bytes of the column 2 value, while parameter 3 may be mapped to a second set of bytes of the column 2, according to the following equation:

COL2=0x10000*PARAM3+PARAM2

Accordingly, if column 2 is 8 bytes long, the second parameter will be contained in the lower four bytes, while the third parameter will be contained in the upper four bytes. Of course, any other suitable equation or technique may also be used to map more than one ID parameter to a single column value.

Figure 4B:
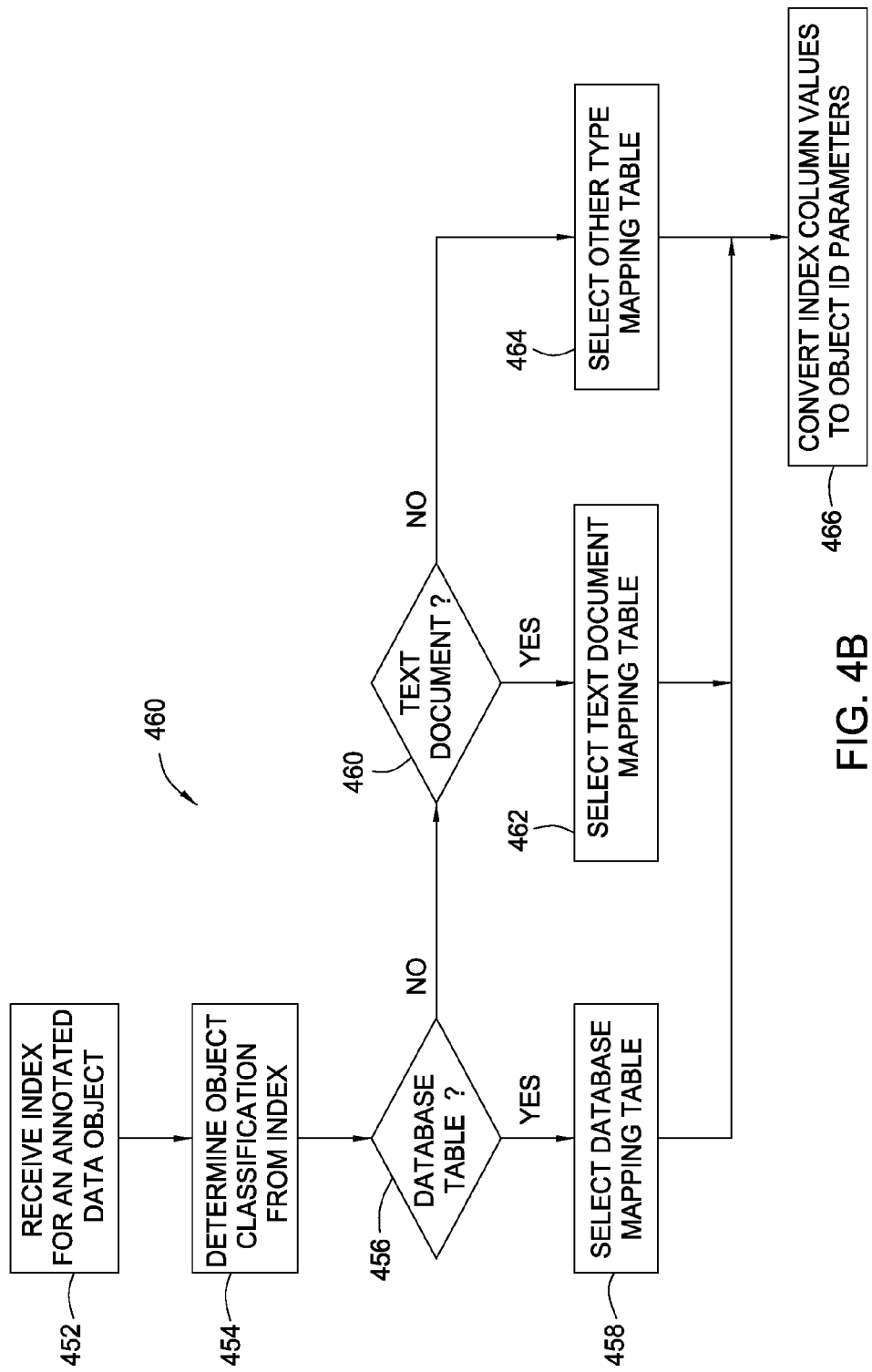

As previously described, for retrieval purposes, the indexing component 133 should also be configured to generate a set of ID parameters 124 for an annotated data object 122, given a corresponding index 151. For example, the annotation system 130 may return a set of ID parameters 124 to an application program 120 to identify an annotated data object. Therefore, mapping tables 134 may also contain sufficient information (e.g., "inverse" mapping functions) to allow the indexing component 133 to convert column values of an index 151 back to a set of ID parameters 124. FIG. 4B illustrates exemplary operations 450 (similar to the operations 400), that may be performed by the indexing component 133 to generate a set of ID parameters 124 from an index 151.

The operations 450 begin, at step 452, by receiving an index for an annotated data object, for example, as a result of searching the index table 152 for a set of annotated data objects 122 in response to a request from an application program 120. The index may be in the form of a set of column values, or a single value generated by combining the column values. At step 454, a classification for the object is determined based on the index. As described with reference to FIG. 4A, the object classification may be used to select a mapping table 134, which may be used to convert the index column values to ID parameters 124, as illustrated in steps 456-466.

Hierarchical Index Formats

Documents are typically arranged as hierarchical structures of different "levels" of data objects, each of which may be annotated for different reasons. For example, a database table may be annotated to explain why it was created (its purpose), a database column may be annotated to clarify what type of data is stored therein, a database row may be annotated to comment on a particular set of data (e.g., all related to a common patient), while a database cell may be annotated to comment on the significance of a particular value stored therein (e.g., an alarmingly high test result). In general, higher level data objects may be identified by indexes with fewer column values than indexes for lower level data objects (which may be regarded as sub-objects of the higher level data objects).

Accordingly, different level data objects (as well as different data objects of the same level) within the same document may be identified by indexes comprising different combinations of some or all of the index table column values. For example, as illustrated in FIG. 6A, a document index may include only location and file column values (e.g., with NULL values inserted for the remaining column values), a section index may include location, file, and section column values, while a paragraph index may include location, file, section, and paragraph column values. An index for a specific word, however, may require all illustrated column values: location, file, section, paragraph, and word (an index for a group of words may additionally include a length parameter indicating the number of words in the group).

In a similar manner, as illustrated in FIG. 6B, indexes for different database objects may also include different column values. For example, a database index may include only a location column value, while a table index may also include a table column value. In addition to location and table column values, a column index may include an index value for a column name (or number), a row index may include an index value for a row number, while a cell index may include index values for both a row number and column name (or number).

As will be described in greater detail below, a list of annotated data objects may be obtained by searching the index table 152 for indexes that match one or more "higher level" column values, without specifying column values used to identify lower level sub-objects (or by using a "wild card" for such column values). As an example, indexes for annotated sections, paragraphs, and words of a text document, may all be retrieved by searching the index table 152 for indexes matching only specified location and file column values. As another example, indexes for annotated columns, rows, and cells of a database table may be retrieved by searching only on location and table column values.

Utilizing Annotation Indexes

Figure 7:
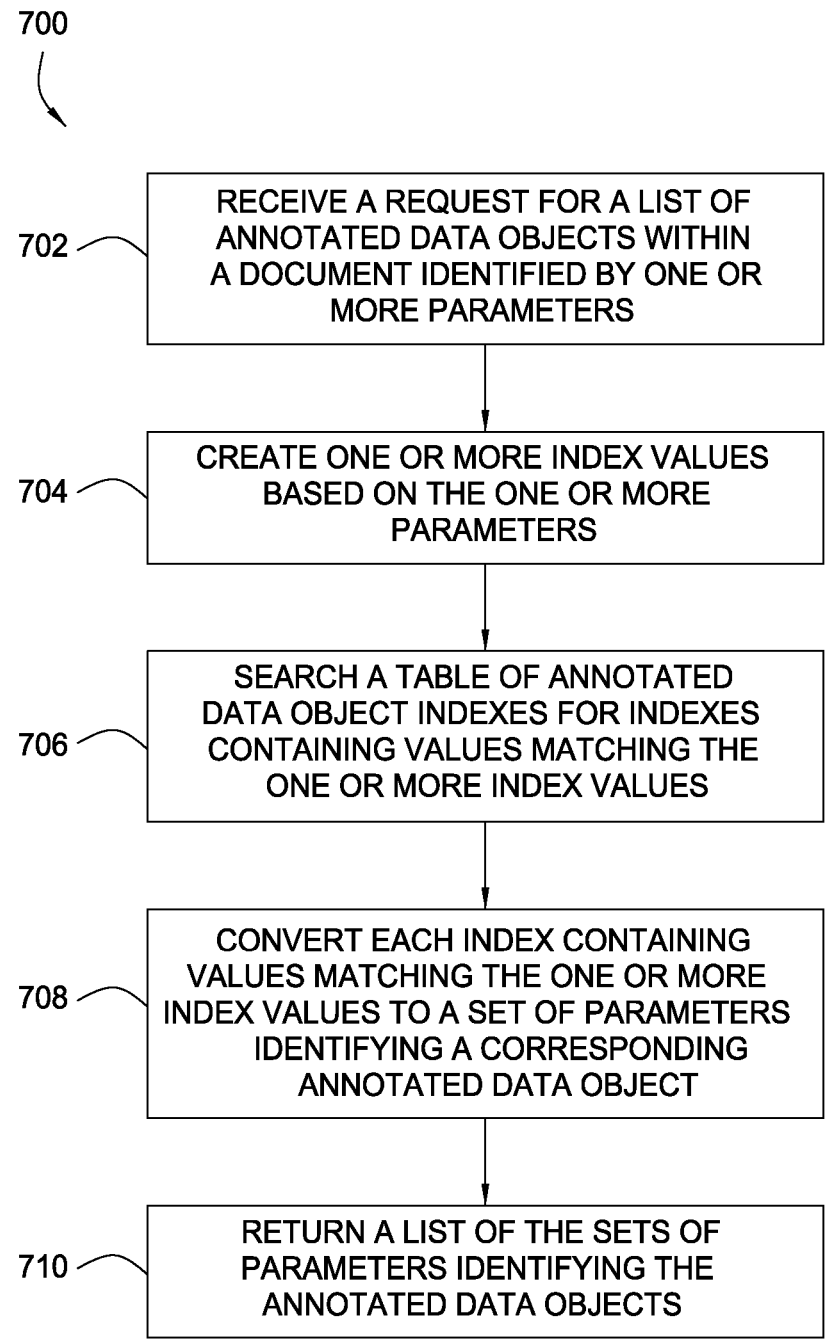
FIG. 7 is a flow diagram of exemplary operations for retrieving a list of annotated data objects according to one embodiment of the present invention.
Figure 9:
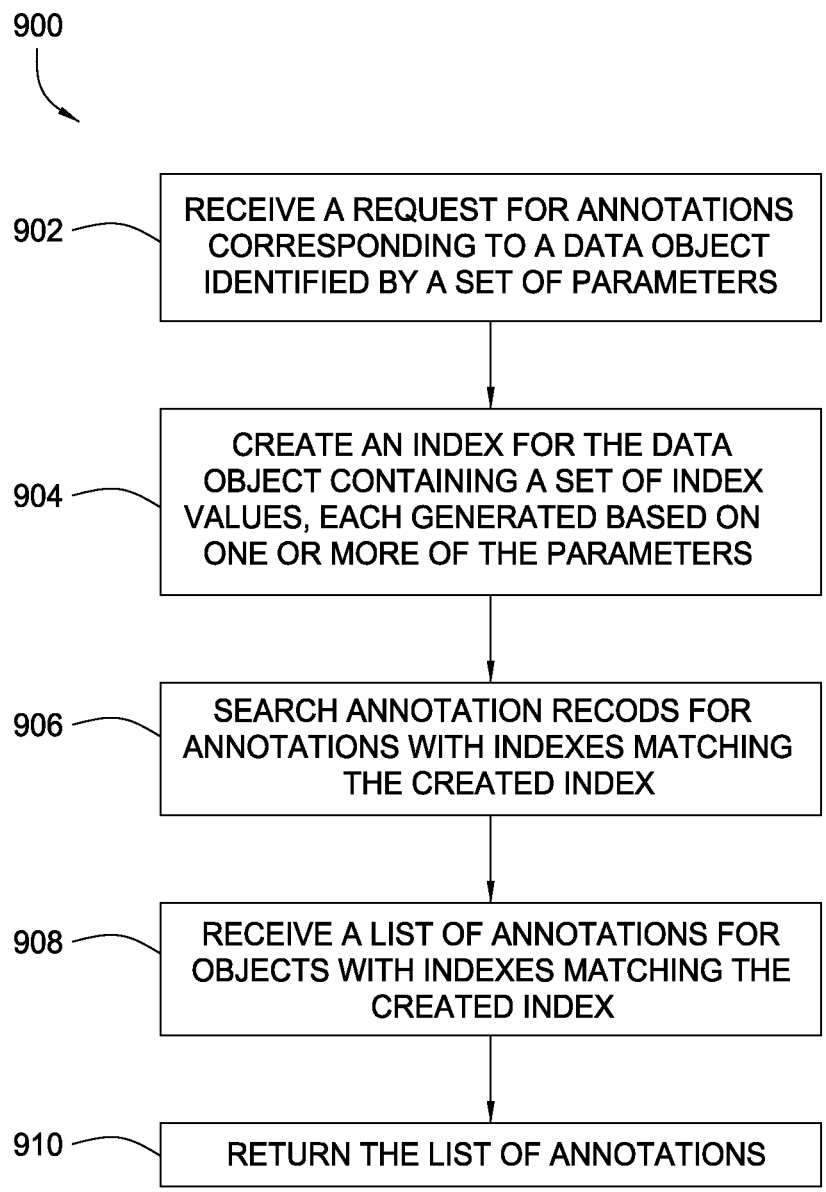
FIG. 9 is a flow diagram of exemplary operations for retrieving a list of annotations for a specified data object, according to one embodiment of the present invention.

As previously described, by generating an index table 152 with a homogeneous set of index values, conventional indexing schemes may be utilized to organize and search annotations made for a variety of different type data objects. For example, the index table 152 may be searched to obtain a list of annotated data objects for a specified document (as illustrated in FIG. 7). Alternatively, the index table 152 and/or annotation records 150 may be searched to return a set of annotations associated with a specified data object (as illustrated in FIG. 9) or a set of annotations satisfying a specified set of conditions (as illustrated in FIG. 11).

For example, FIG. 7 is a flow diagram of exemplary operations 700 for obtaining a list of annotated data objects for a specified document, for example, in response to a request from an application program 120 for a list of annotations for a recently loaded document (e.g., the application program 120 may be designed to provide an indication of the annotated data objects). The operations 700 begin, at step 702, by receiving a request for a list of annotated data objects within a document identified by one or more ID parameters. At step 704, an index is created for the document based on the one or more ID parameters (e.g., as described above with reference to FIG. 4A). At step 706, the index table 152 is searched for indexes containing column values matching the one or more index values.

As described above, a document may be identified by a relatively small number of "high level" ID parameters (e.g., location and file parameters), which may be mapped to column values of a corresponding index 151. Any of the lower level data objects of the document that have been annotated should have corresponding entries in the index table 152 with the same "high level" column values. Thus, a query searching the index table 152 for matches on these column values should return a list of indexes for all the "lower level" annotated data objects for the document. At step 708, each of the indexes returned from the query is converted to a set of ID parameters that uniquely identifies the annotated data object (e.g., as described above with reference to FIG. 4B). At step 710, a list of the sets of ID parameters identifying the annotated data objects is returned, for example, to a requesting application program 120.

Figure 8:
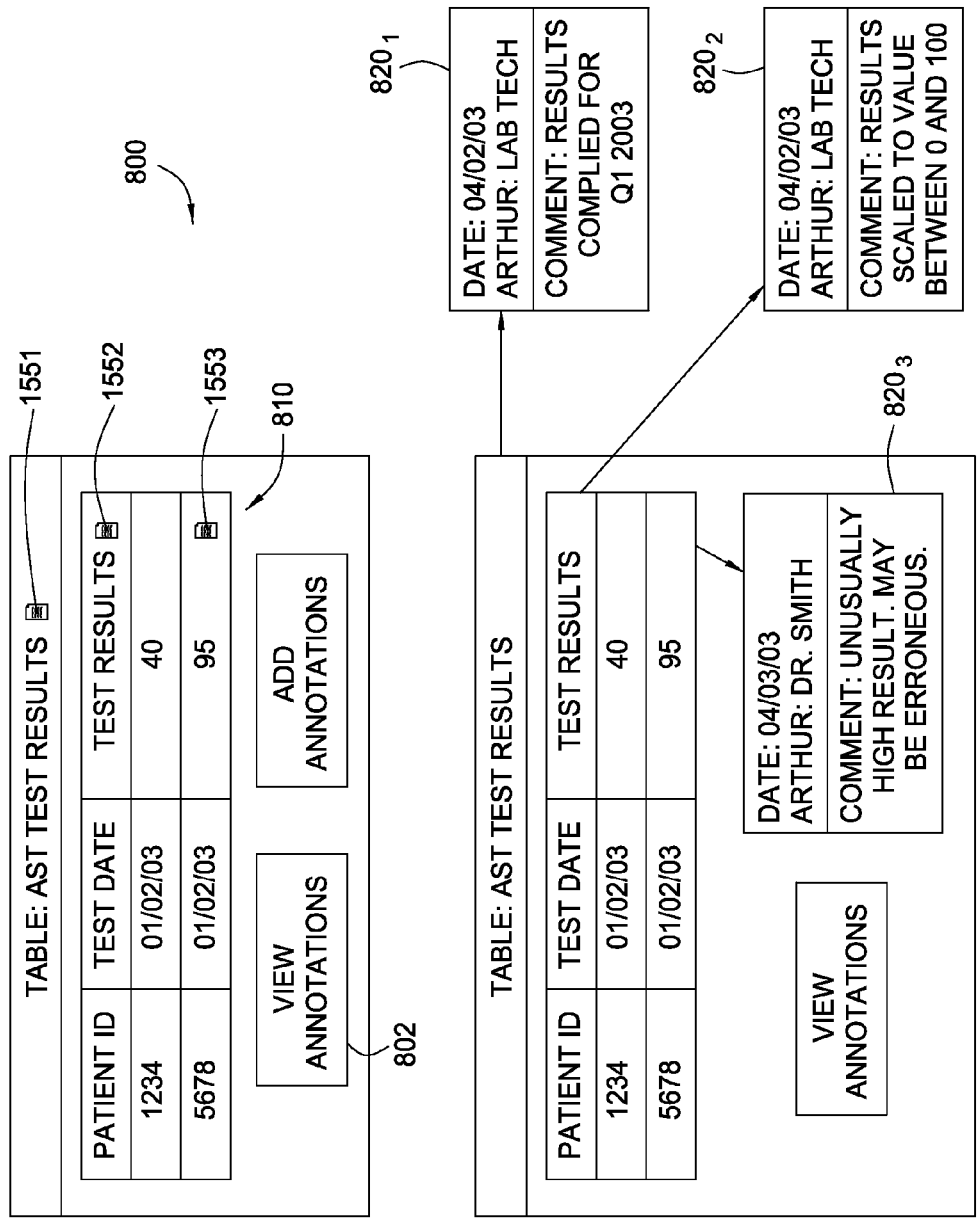
FIGS. 8A and 8B are exemplary graphical user interface (GUI) screens illustrating annotated data objects according to one embodiment of the present invention.

As described above, the requesting application program 120 may then provide an indication of the annotated data objects, for example, by displaying a set of annotation icons 155, as illustrated in the exemplary graphical user interface (GUI) screen 800 of FIG. 8A. The exemplary computer screen 800 shows an illustrative table of test results, having columns for Patient ID, Test Data and Test Results. The annotation icons $155_1$, $155_2$ and $155_3$ indicate that the table itself, the Test Results column, and the second cell in the Test Results column, respectively, are each annotated.

The corresponding annotations may be viewed, for example, by selecting one of the annotation icons 155 (e.g., via a mouse click) or by pressing a View Annotations button 802. As shown in FIG. 8B, for some embodiments, the annotations may be displayed in popup or "fly-over" windows 820 (as shown $820_1$-$820_3$). Depending on the implementation, however, it may be necessary to first retrieve the annotations from the annotation database 139. In other words, for performance reasons, the application program 120 may only retrieve the list of annotated data objects, in order to provide an indication thereof, and may not retrieve the corresponding annotations until receiving a (user) request to view them.

FIG. 9 illustrates exemplary operations 900 that may be performed to retrieve a list of annotations associated with a specified data object. The operations 900 begin, at step 902, by receiving a request for annotations corresponding to a data object identified by a set of ID parameters (e.g., in response to a user selecting an annotation icon 155). At step 904, an index is created based on the ID parameters and, at step 906, the annotation records 150 are searched using the created index (e.g., for indexes having values matching column values of the created index).

For some embodiments, in an effort to improve performance, the index table 152 may first be searched to determine if an annotation exists (e.g., an entry in the index table indicates an annotation exists), and the corresponding annotation may be subsequently retrieved. Further, depending on the implementation, the search may be limited to annotations for the specified data object itself, or may include annotations for any sub-objects of the specified data object. If the request includes annotations for sub-objects, the query may be fashioned as described above with reference to FIG. 7, to return any annotations having indexes that match the higher level index column values.

At step 908, a list of annotations with matching index values is received and, at step 910, the list of annotations is returned. If the request included annotations for sub-objects, the operations 900 may also include converting indexes for the annotated sub-objects into ID parameters identifying the sub-objects and returning the sub-object ID parameters with the list of annotations. In either case, upon receiving the list of annotations, a requesting application program may display the annotations in a document, as shown above in the GUI screen 800 of FIG. 8B.

For some implementations, an application program 120 may display a list of annotations in a separate annotation window 1000, as illustrated in FIG. 1A. As shown, annotation icons 155 corresponding to the listed annotations may optionally be displayed, as well, to identify which data objects are associated with which annotations. In some cases, a user may have a desire to search for annotations (e.g., other than just those listed in annotation window 1000) satisfying certain conditions, and their corresponding data objects. As an example, a medical researcher may be interested in reviewing annotations authored by his manager, and/or annotations created within a certain time range (e.g., within the last month), as well as reviewing the annotated data. For example, the manager may have generated annotations that question the validity of certain data and the researcher may be charged with verifying and/or correcting the data in question.

Figure 10:
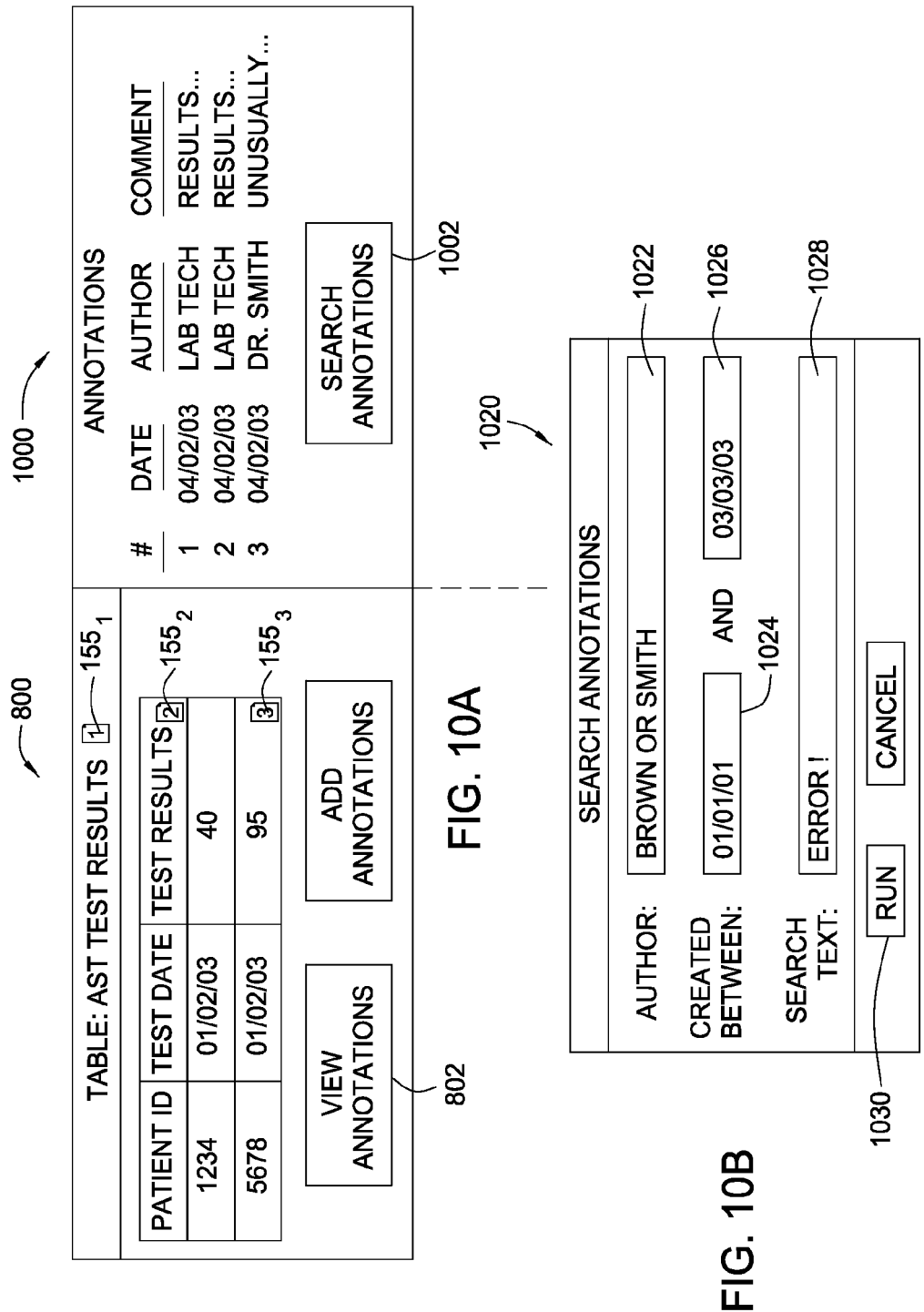
FIGS. 10A and 10B are exemplary GUI screens illustrating a list of annotations and an interface for searching annotations, respectively, according to one embodiment of the present invention.

Therefore, for some embodiments, the annotation system 130 may provide a GUI screen 1020 for searching annotations (possibly accessible from the annotation window 1000 via a Search Annotations button 1002), as illustrated in FIG. 10B. The GUI screen 1020 may allow a user to specify search conditions to be used in searching annotation records 150. For example, the GUI screen 1020 may include text boxes 1022-1028, allowing a user to enter search conditions based on an Author of the annotation (1022), a range of dates in which the annotation was created (1024 and 1026), as well as a string of text contained in the content of the annotation (1028). Upon initiation of the query by the user (e.g., via a Run button 1030), the annotation system 130 may generate and issue a query against the annotation database 139 to return a list of annotations satisfying the specified query conditions, as well as the associated data objects.

Figure 11:
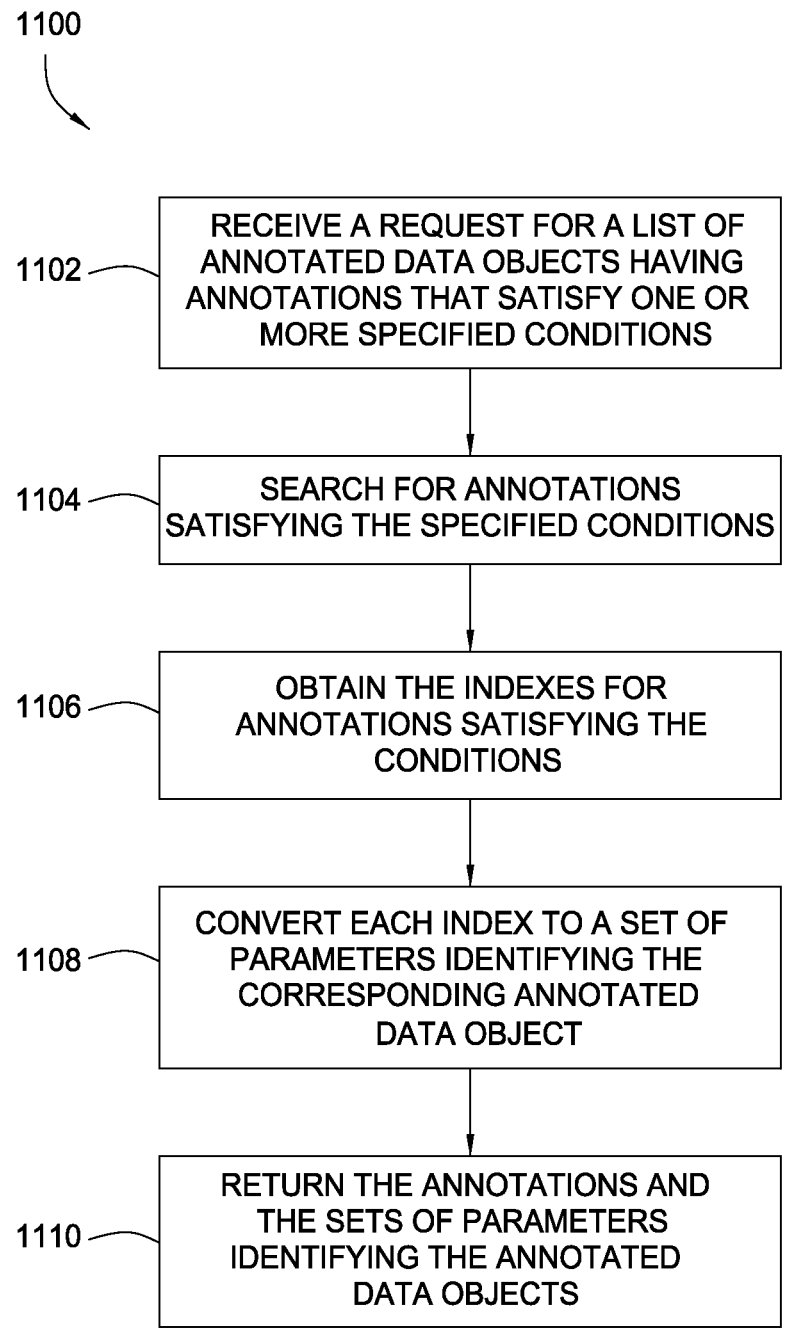
FIG. 11 is a flow diagram of exemplary operations for searching annotations according to one embodiment of the present invention.

FIG. 11 is a flow diagram of exemplary operations that may be performed by the annotation system 130 to retrieve a list of annotations satisfying a set of specified conditions, such as those that may be specified via the GUI 1020 of FIG. 10B. The operations 1100 begin, at step 1102, by receiving a request for a list of annotated data objects having annotations that satisfy one or more specified conditions (e.g., a specified author, creation date and/or content). At step 1104, the annotation database 139 is searched (queried) for annotations satisfying the one or more specified conditions. At step 1106, the indexes for data objects associated with the annotations satisfying the one or more specified conditions (if any) are obtained. At step 1108, each of the obtained indexes is converted to a set of parameters identifying the corresponding annotated data object.

At step 1110, the annotations and corresponding sets of identifying parameters are returned, for example, to a requesting application program 120. The application program 120 may then provide an indication of the annotations satisfying the specified conditions, for example, as a list of annotations in an annotation window 1000, as shown in FIG. 10A. For some embodiments, a user may be provided the ability to retrieve or display an annotated data object by selecting (e.g., double-clicking) one of the listed annotations. For example, an application associated with the document containing the annotated data object may be automatically invoked upon selecting the annotation.

Conclusion

By creating a table of homogeneous indexes, annotations created for a wide variety of heterogeneous data objects may be organized and searched using conventional database indexing technology. Homogeneous indexes may be created by mapping one or more parameters that uniquely identify annotated data objects to one or more column values in the index table. Mapping tables that define how the identifying parameters of the corresponding data type will be mapped to the columns of the index table may be provided for each different type (or classification) of data object that may be annotated. Accordingly, indexes may be created for new data object classifications via the addition of new mapping tables, without having to redesign the index table or the underlying indexing scheme, thus saving development time and associated cost.

While the foregoing is directed to embodiments of the present invention, other and further embodiments of the invention may be devised without departing from the basic scope thereof, and the scope thereof is determined by the claims that follow.

What is claimed is:

1. A computer implemented method, comprising:
creating an annotation corresponding to a first data object identified by a first plurality of identifying parameters that identify a location of the first data object;
creating an index for the first data object, the index comprising one or more index values, each generated based on one or more of the first plurality of identifying parameters that identify a location and a type of the first data object; wherein the index contains entries for a plurality of annotated data objects corresponding to each of a plurality of different data types, each data object having been indexed in the index according to its respective data type;
creating a record containing the annotation corresponding to the first data object and the index for the first data object; and
storing the record in a storage medium.

2. The method of claim 1, where a number of the index values is greater than a number of the first plurality of identifying parameters.

3. The method of claim 1, wherein the first data object and a second data object are of different types.

4. The method of claim 1, wherein the first object is a sub-object of a second object and a second set of identifying parameters is a subset of the first plurality of identifying parameters.

5. The method of claim 1, wherein:
the first data object is contained in a text document, wherein the first plurality of identifying parameters includes at least one or more parameters indicating a location and name of the text document; and
the plurality of annotated data objects includes a second data object which is contained in a database table, wherein a second plurality of identifying parameters includes at least one or more parameters indicating a location and name of the database table.

6. The method of claim 1, wherein data types are selected from the group comprising: text files, database records, multimedia files and any combination thereof.

7. A computer implemented method of managing annotations for a plurality of different type data objects, comprising:
receiving a set of parameters identifying an annotated data object, wherein the identifying parameters identify a location and a data type of the annotated data object; wherein the data type is one of a plurality of different data types;
selecting, based on the set of identifying parameters, a mapping from a plurality of mappings, each containing a different set of mapping functions; wherein each mapping of the plurality of mappings is specific to a different one of the plurality of different data types; and
modifying an index for the annotated data object by mapping the identifying parameters to columns in an index table, as specified by the mapping functions of the selected mapping; wherein the index contains entries for a plurality of annotated data objects corresponding to each of the plurality of different data types.

8. The method of claim 7, wherein the mapping functions of at least one of the mappings maps more than one identifying parameter to a single column.

9. The method of claim 8, wherein the more than one identifying parameters are mapped to different sets of bytes in the single column.

10. The method of claim 7, wherein data types are selected from the group comprising: text files, database records, multimedia files and any combination thereof.

11. A computer implemented method of managing annotations for a plurality of different type data objects, comprising:
creating annotations for a plurality of data objects, wherein each data object is of a different data type and each data object has a respective set of parameters identifying the data type and location of the respective data object;
for each annotated data object:
selecting, based on the respective set of identifying parameters, a mapping from a plurality of mappings, whereby the mapping is selected based on object type; and wherein each mapping of the plurality of mappings contains a different set of mapping functions; and
creating an index for each annotated data object by mapping the identifying parameters to columns in a common index table, as specified by the mapping functions of the selected mappings.

12. The method of claim 11, wherein data types are selected from the group comprising: text files, database records, multimedia files and any combination thereof.

13. The method of claim 11, wherein the mapping functions of at least one of the mappings maps more than one identifying parameter to a single column.

14. The method of claim 13, wherein the more than one identifying parameters are mapped to different sets of bytes in the single column.

* * * * *